United States Patent
Singh et al.

(10) Patent No.: US 9,396,185 B2
(45) Date of Patent: Jul. 19, 2016

(54) METHOD AND APPARATUS FOR PROVIDING A CONTEXTUAL DESCRIPTION OF AN OBJECT

(75) Inventors: Munindar P. Singh, Cary, NC (US); Mona Singh, Cary, NC (US)

(73) Assignee: Scenera Mobile Technologies, LLC, Raleigh, NC (US)

( * ) Notice: Subject to any disclaimer, the term of this patent is extended or adjusted under 35 U.S.C. 154(b) by 1386 days.

(21) Appl. No.: 11/554,840

(22) Filed: Oct. 31, 2006

(65) Prior Publication Data

US 2008/0103756 A1    May 1, 2008

(51) Int. Cl.
*G06F 17/27* (2006.01)
*G06F 17/28* (2006.01)

(52) U.S. Cl.
CPC ............ *G06F 17/2881* (2013.01); *G06F 17/27* (2013.01)

(58) Field of Classification Search
CPC ............................ G10L 17/27; G10L 17/2881
USPC .......................................... 704/4, 9, 270, 272
See application file for complete search history.

(56) References Cited

U.S. PATENT DOCUMENTS

| | | | |
|---|---|---|---|
| 5,239,617 A * | 8/1993 | Gardner et al. ................ 706/11 |
| 6,314,402 B1 | 11/2001 | Monaco et al. |
| 6,580,787 B1 | 6/2003 | Akhteruzzaman et al. |
| 6,721,706 B1 * | 4/2004 | Strubbe et al. ................ 704/275 |
| 6,785,651 B1 * | 8/2004 | Wang ............................. 704/246 |
| 6,938,079 B1 * | 8/2005 | Anderson et al. ............. 709/222 |
| 6,988,128 B1 | 1/2006 | Alexander et al. |
| 7,027,975 B1 * | 4/2006 | Pazandak et al. ................ 704/9 |
| 7,043,420 B2 * | 5/2006 | Ratnaparkhi ..................... 704/9 |
| 7,155,456 B2 | 12/2006 | Abbott, III et al. |
| 7,346,489 B1 * | 3/2008 | Bever et al. ........................ 704/4 |
| 7,395,507 B2 | 7/2008 | Robarts et al. |
| 7,512,889 B2 | 3/2009 | Newell et al. |
| 7,533,082 B2 | 5/2009 | Abbott et al. |
| 7,614,001 B2 | 11/2009 | Abbott et al. |
| 7,742,924 B2 * | 6/2010 | Miyata et al. ................. 704/275 |
| 2002/0095295 A1 | 7/2002 | Cohen et al. |
| 2002/0116173 A1 * | 8/2002 | Ratnaparkhi ..................... 704/9 |

(Continued)

FOREIGN PATENT DOCUMENTS

WO    WO 01/67241 A1    9/2001

OTHER PUBLICATIONS

Mallya et al. "Resolving Commitments among Autonomous Agents" 2004.*

(Continued)

*Primary Examiner* — Douglas Godbold

(57) ABSTRACT

A method for providing a contextual description of an object includes receiving a first object associated with a user. The first object has a first object type representing one of a place, an event, and a person and includes a first attribute associated with the respective place, event, or person. A second object is identified that has a second attribute related to the first attribute, and has a second object type representing one of a place, an event, and a person. According to an exemplary embodiment, a first pre-defined phrase template corresponding to the first object type is dynamically combined with a second pre-defined phrase template corresponding to the second object type to form a linguistic prompt related to the place, event, or person representing the first object. The linguistic prompt is then presented to the user to describe the place, event, or person representing the first object.

33 Claims, 4 Drawing Sheets

(56) References Cited

U.S. PATENT DOCUMENTS

| | | | |
|---|---|---|---|
| 2002/0128821 A1* | 9/2002 | Ehsani et al. | 704/10 |
| 2004/0199375 A1* | 10/2004 | Ehsani et al. | 704/4 |
| 2005/0125232 A1* | 6/2005 | Gadd | 704/270.1 |
| 2005/0256717 A1* | 11/2005 | Miyata et al. | 704/270 |
| 2006/0025997 A1 | 2/2006 | Law et al. | |
| 2006/0074894 A1* | 4/2006 | Remahl | G06F 17/30867 |
| 2006/0271351 A1* | 11/2006 | Mirkovic et al. | 704/4 |

OTHER PUBLICATIONS

Barnett et al. "Designing a Portable Spoken Dialogue System" 1997.*

Singh et al. "Automating Spoken Dialogue Systems" 1997.*

Singh et al. "Computing the Temporal Structure of Events in Natural Language" 1992.*

Singh M.P., Vouk M.A.: Network Computing. In: Webster, J.G. (ed.): Encyclopedia of Electrical and Electronics Engineering, 14 (Mu-Nu), John Wiley (1999) 114-132.*

M. Singh, J. Barnett, and M. Singh. Enhancing conversational moves for portable dialogue systems. In Working Notes of the AAAI Fall Symposium Communicative Action in Humans and Machines, Menlo Park, Calif., 1997.*

Gabsdil. "Clarification in Spoken Dialogue Systems" 2003.*

Weng et al. "CHAT: A Conversational Helper for Automotive Tasks" Sep. 21, 2006.*

Varges et al."Robust language analysis and generation for spoken dialogue systems" Aug. 2006.*

Doss, J.S., et al., "Calendar Awareness Services," IBM, Feb. 6, 2003, 9 pages.

* cited by examiner ns which will be used to more fully describe the representations which will be used to more fully describe the representative embodiments disclosed here and can be used by those skilled in the art to better understand the representative

METHOD AND APPARATUS FOR PROVIDING A CONTEXTUAL DESCRIPTION OF AN OBJECT

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

BACKGROUND

Electronic devices, such as laptop and desktop computers, handheld personal digital assistants (PDAs), mobile phones, digital cameras, and the like, offer a variety of utility applications and services to their respective users. For example, many devices include calendaring and/or "to-do list" applications that allow the user to calendar appointments and to enter tasks directly into the device or into a calendaring service in a remote server. The calendaring application can be configured to provide a reminder of an appointment or task to the user at or near the time the appointment has been scheduled.

In addition, mobile communication devices, such as handheld PDAs and smartphones, typically include applications that determine and utilize the current location of the device. For example, a mapping application can use the device's current location to provide street directions from the current location to a desired destination location. These devices often include a position determining system that is configured to identify the position of the device within a certain range depending on the device and location identifying technique. Some devices can use a sophisticated position determining system, such as a Global Positioning System (GPS). The GPS is a satellite-based radio navigation system that uses signals from three or four satellites to compute the current latitude, longitude and elevation of a GPS receiver in the device anywhere on earth down to within a few meters. Other devices can use a location identifying technique based on which base station is servicing the device, that is, the location of the device is within a range of the base station from which a call is made. Other devices can use location identifying techniques based on triangulation between the device and at least two base stations.

In order to make electronic devices more user friendly, many utility applications are now configured to interact dynamically with the user. In some instances, an application can provide linguistic phrases or prompts which the user can simply select so that the user is not required to manually type in the selected phrase. This is particularly helpful for users of handheld communication devices that have small keypads and/or keys. An application can also provide a prompt to the user that refers to an object about which some user decision or action is requested. For example, the object can be a person, place or event and the application can generate a prompt asking the user whether he would like to take an action regarding the person, place or event.

While providing prompts can be very useful, their effectiveness can be limited if the user has trouble identifying the object to which the prompt refers. For example, if the prompt refers to a person and the user cannot remember who the person is, then the user might have difficulties deciding whether the requested action should be taken.

To help the user, some applications can provide a brief description of the object. Nevertheless, because most applications are discrete modules that operate independently from each other, the content of the description is limited to the nature of the application. For example, an address book application typically manages contact information and a mapping application typically manages location information. In most cases, the address book application cannot access/use the location information and vice versa. Accordingly, the description generated by the address book application is limited to contact information, while the description generated by the mapping application is limited to location information. Ideally, the description of the object should be contextual and meaningful to the user, and should not be limited to the nature of application for which the prompt is used.

SUMMARY

Accordingly, a method and apparatus for providing a contextual description of an object are described. In one exemplary embodiment, the method includes receiving a first object associated with a user. The first object has a first object type representing one of a place, an event, and a person and includes a first attribute associated with the respective place, event, or person. A second object is identified that has a second attribute related to the first attribute, and has a second object type representing one of a place, an event, and a person. According to an exemplary embodiment, a first pre-defined phrase template corresponding to the first object type is dynamically combined with a second pre-defined phrase template corresponding to the second object type to form a linguistic prompt related to the place, event, or person representing the first object. The linguistic prompt is then presented to the user to describe the place, event, or person representing the first object.

In another exemplary embodiment, an apparatus for providing a contextual description of an object includes an object description module and a data store coupled to the object description module for storing information relating to places, events and people associated with the user. The object description module includes an object determination unit configured to receive a first object having a first object type representing one of a place, an event, and a person. The first object is associated with a user and includes a first attribute associated with the respective place, event, or person. The object determination unit is further configured to identify a second object having a second attribute related to the first attribute, and a second object type representing one of a place, an event, and a person. The object description module further includes a phrase generator and a presentation unit. The phrase generator is configured to dynamically combine a first pre-defined phrase template corresponding to the first object type with a second pre-defined phrase template corresponding to the second object type to form a linguistic prompt related to the place, event, or person representing the first object. The presentation unit is configured to present the linguistic prompt to the user to describe the place, event, or person representing the first object.

BRIEF DESCRIPTION OF THE DRAWINGS

The accompanying drawings provide visual representations which will be used to more fully describe the representative embodiments disclosed here and can be used by those skilled in the art to better understand the representative embodiments and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

Figure 1A:
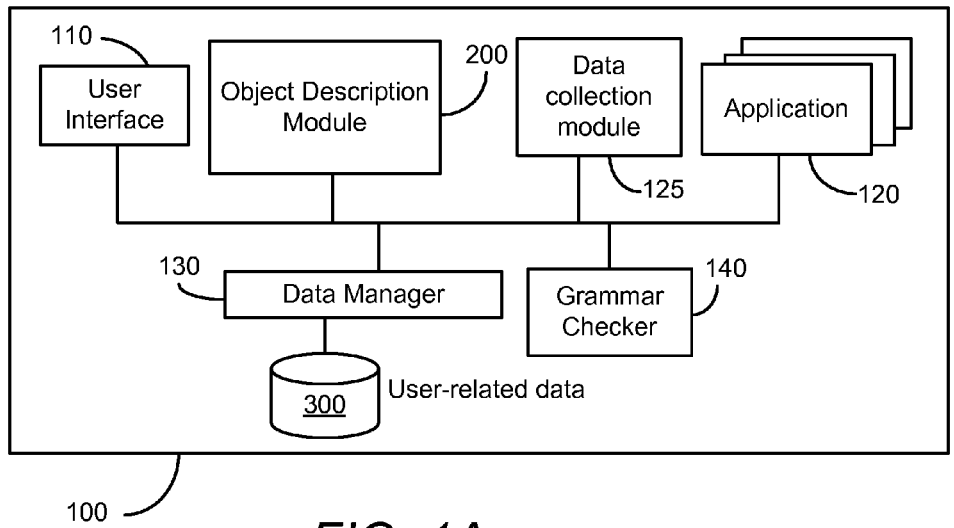
FIG. 1A and FIG. 1B are block diagrams each illustrating an exemplary apparatus for providing a contextual descriptor for an object according to two exemplary embodiments.

FIG. 1A is a block diagram illustrating an exemplary system for providing a contextual description of an object according to one embodiment. In this embodiment, an electronic device 100, such as a laptop or desktop computer, associated with a user includes a user interface 110, and a plurality of user applications 120. The user applications 120 are configured to interact with the user to enable the user to perform specific actions that can involve places, other people or users, and events. For instance, typical applications 120 can include an address book application, a calendaring application, a location/mapping application, an application that enables the user to make phone calls, an application that supports electronic messaging, and the like. The device 100 can also include circuitry that can track a position of the device 100. For example, the device 100 can include a position locator system (not shown) that tracks the position of the device 100, which can then be used by at least one of the applications 120.

According to an exemplary embodiment, the system 100 includes means for monitoring and collecting data generated or utilized by the plurality of applications 120, such as a data collection module 125, and a means for organizing and storing the collected data, such as a data manager 130 and data store 300. In an exemplary embodiment, the data collection module 125 is configured to gather user-related data involving places, people, and events from various sources, such as the user and the applications 120. The data collection module 125 can pass the data to the data manager 130 which manages and stores the user-related data in the data store 300.

In an exemplary embodiment, the system 100 includes means for analyzing an object, such as a person, place or event, and generating a contextual description of the object based on the user-related data. For example, the system 100 can include an object description module 200 that is configured to receive from an application 120 an object for which a description is needed, and to generate a linguistic prompt that describes the object in relation to another object. The object description module 200 is described in more detail below.

The system illustrated in FIG. 1A is but one exemplary arrangement. In this arrangement, the functionality of the object description module 200 is integrated with that of the electronic device 100. Moreover, the user-related data is securely managed and stored internally. Other arrangements can be designed by those skilled in the art.

Figure 1B:
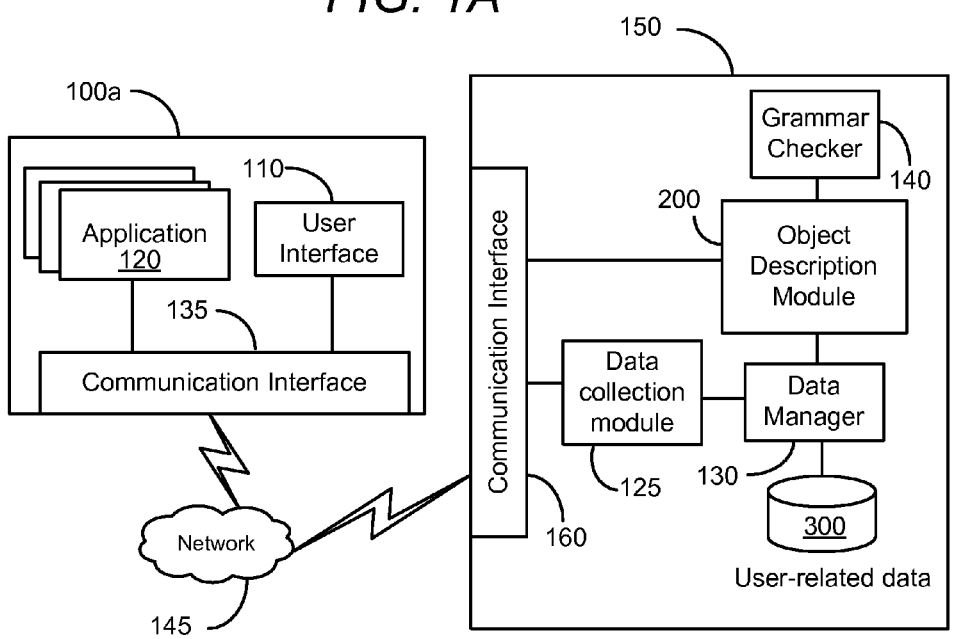

For example, in another embodiment, illustrated in FIG. 1B, the functionality of the object description module 200, the data collection module 125, the data manager 130 and the data store 300 can be included on a server 150 that is accessible by an electronic user device 100a, such as a digital camera/phone, PDA, or the like, over a network 145. In this arrangement, the electronic user device 100a includes circuitry for communicating with the server 150. For example, the device 100a can include a communication interface 135 coupled to the user interface 110 that allows the user to use the device 100a to communicate with the server 150 over a wireless network 145 using one or more communication protocols. The device 100a includes a plurality of applications 120, such as those described above, which can be configured to transmit the user-related data to the server 150 via the network 145 using the communication interface 135. In one embodiment, the communication interface 135 is configured to establish a secure transmission channel to the server 150 so that the user-related data can be sent securely.

In one embodiment, the server 150 can be a personal computer or other device capable of processing data. The server 150 also includes a communication interface 160 to transmit and receive data securely over the network 145. In an exemplary embodiment, the data collection module 125 can be configured to receive or to retrieve the user-related data from the user device 100a via the network 145 using the communication interface 160. Advantageously, in this embodiment, the user device 100a can be "thin" because the user-related data can be stored remotely on the server 150 and securely managed by the data manager 130 at the server 150.

While two system embodiments have been described above, variations of these embodiments may be utilized and structural and functional modifications may be made without departing from the scope of the present disclosure. For example, the data collection module 125, data manager 130 and data store 300 can be located at another independent data server that is communicatively coupled via the network 145 to the object description module 200, which can be at the server 150 or in the user device 100. In this configuration, the data collection, management and storage function can be separated from the functionality of the object description module 200.

Figure 2:
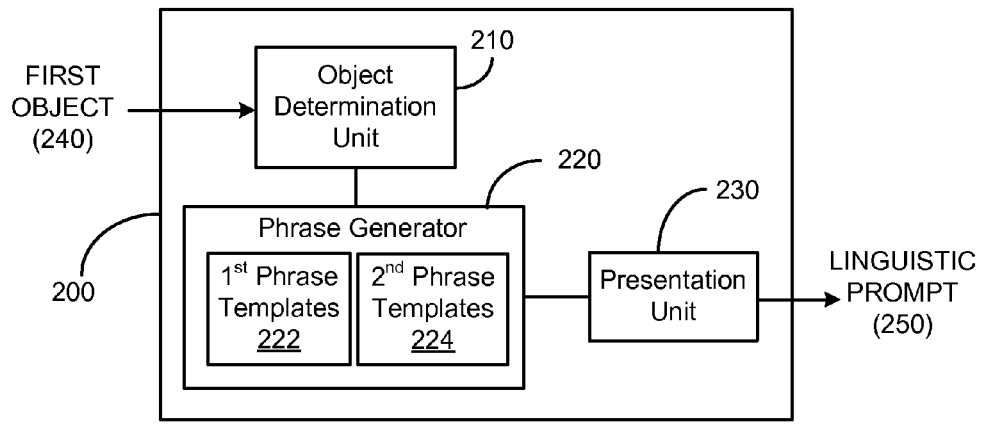
FIG. 2 is a block diagram illustrating an object description module according to an exemplary embodiment.

As stated above, the object description module 200 is configured to generate a contextual description of an object, such as a place, person or event, based on the user-related data. FIG. 2 is a block diagram that illustrates an exemplary object description module 200 according to one embodiment. The object description module 200 includes means for receiving an object to be described (referred to here as the first object) and means for identifying at least one other object related the first object (referred to here as the second object). For example, in one embodiment, the object description module 200 can include an object determination unit 210 that is configured to receive the first object and to identify the second object(s).

Figure 3:
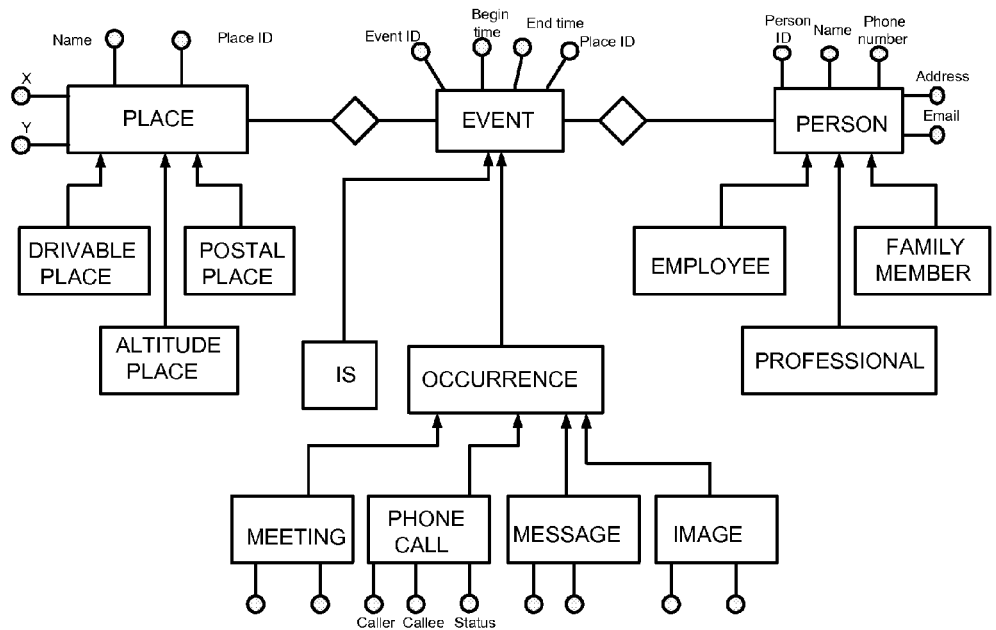
FIG. 3 illustrates a database schema for an exemplary user-related information database according to one embodiment.

In an exemplary embodiment, the objection determination unit 210 is configured to identify the second object based on the user-related data collected by the data collection module 125 and stored in the data store 300. In one embodiment, the data store 300 can be a relational database where the user-related data is stored in a plurality of tables. FIG. 3 illustrates an exemplary database schema for the user-related database 300. As is shown, entities or object types are represented by rectangular boxes. The objects are instances of the entities. Relationships or associations between entities are represented by diamonds. Each entity can be associated with at least one attribute, represented by the small circles, and each entity can be associated with one or more immediate subclasses, represented by a directed line from the subclass to the given entity. Subclasses can be immediate or non-immediate (represented by a directed path composed of two or more directed lines chained from intermediate entities). A subclass (immediate or non-immediate) inherits the attributes of its superclass(es).

In one embodiment, entities can include a Place, an Event, and a Person. The Place entity can represent locations, such as places the user has visited or taken some action, e.g., placed or received a phone call, taken a picture, or received or sent a message. The Person entity can represent people, such as people with whom the user has interacted. The Event entity can represent occurrences, such as meetings, phone calls, messages, and images, and presence of a person at a place (as captured by "IS" in FIG. 3). In an exemplary embodiment, the Event entity can be associated with persons and places.

In one embodiment, a plurality of relational tables is created according to the database schema described above. For example, in one embodiment, tables corresponding to the Place, Phone Call, and Person entities can be provided to store user-related data. Each table can specify at least one key, one of which is a primary key and others of which can be one or more foreign keys to other tables. For example, attributes whose names end with the characters "ID" can be primary keys (also known as "identifiers") of their respective tables.

Table 1 is an exemplary table representing the PERSON entity where the "Person ID" attribute is defined as the primary key.

TABLE 1

| Person ID | Name | Phone Number | Street Address | Email |
|---|---|---|---|---|
| N1 | This user | 123-4567 | 555 Red St. | thisUser@co.com |
| N2 | Bob | 555-1212 | Null | bob@here.com |
| N3 | Null | 999-9999 | Null | Null |
| N4 | Null | 777-7777 | Null | Null |

Table 2 is an exemplary table representing the PLACE entity where the "Place ID" attribute is defined as the primary key, the "X" attribute is the longitudinal geospatial coordinate, the "Y" attribute is the latitude geospatial coordinate, and the "Name" attribute is a string naming the given place.

TABLE 2

| Place ID | X | Y | Name |
|---|---|---|---|
| P1 | 35:40.33 deg N | 60:45.21 deg E | Null |
| P2 | 37:24.19 deg N | 56:18.62 deg E | Null |
| P3 | Null | Null | IPAC |

Table 3 is an exemplary table representing the PHONE CALL entity, which is a subclass of the EVENT entity.

TABLE 3

| Event ID | Begin Time | End Time | Place ID | Caller Person ID | Status | Callee Person ID |
|---|---|---|---|---|---|---|
| C1 | 1234 | 1240 | P1 | N2 | Completed | N1 |
| C2 | 1237 | 1237 | P2 | N3 | Not Completed | N1 |
| C3 | 1340 | 1345 | P2 | N1 | Completed | N4 |

In one embodiment, the EVENT entity, including its PHONE CALL subclass, includes as attributes "Event ID," which is the primary key, and "Begin Time" and "End Time," which describe when the specified event began and ended. These time attributes can be stored using a standard data type such as the SQL Date or as the number of milliseconds since Jan. 1, 1970. In one embodiment, the times can be future times so that future (anticipated) events can be stored and considered. The "End Time" may be null where it is indefinite, e.g., for ongoing calls, and the "Begin Time" can be null where it is indefinite, e.g., where somehow knowledge about the beginning is not available. In addition, the EVENT entity can include a "Place ID" attribute, which is a foreign key to the Place ID column of the PLACE entity table. The PHONE CALL subclass can include attributes associated with the subclass, such as "Caller Person ID" and "Callee Person ID," which are foreign keys to the Person ID column of the PERSON entity table, and "Status," which refers to the status of the call.

Referring again to FIG. 2, the object description module 200 includes means for generating a contextual description, such as a phrase generator 220. In an exemplary embodiment, the phrase generator 220 is configured to receive the first and second object from the object determination unit 210 and to create a linguistic prompt that describes the first object in relation to the second object. According to one embodiment, the phrase generator 220 includes a plurality of first object phrase templates 222 and a plurality of second object phrase templates 224, all of which are pre-defined linguistic templates. Alternatively, the plurality of first object phrase templates 222 and the plurality of second object phrase templates 224 can be stored in and retrieved from the data store 300 along with the user-related data. The phrase generator 220 is configured to select a first object phrase template 222 and at least one of the second object phrase templates 224, and to combine the first 222 and second 224 phrase templates to form the linguistic prompt that describes the first object.

The object description module 200 also includes means for presenting the linguistic prompt to the user, such as a presentation unit 230. In one embodiment the presentation unit 230 is configured to generate a message that includes the linguistic prompt and to send the message to the user interface 110 so that it can be displayed to the user.

Figure 4:
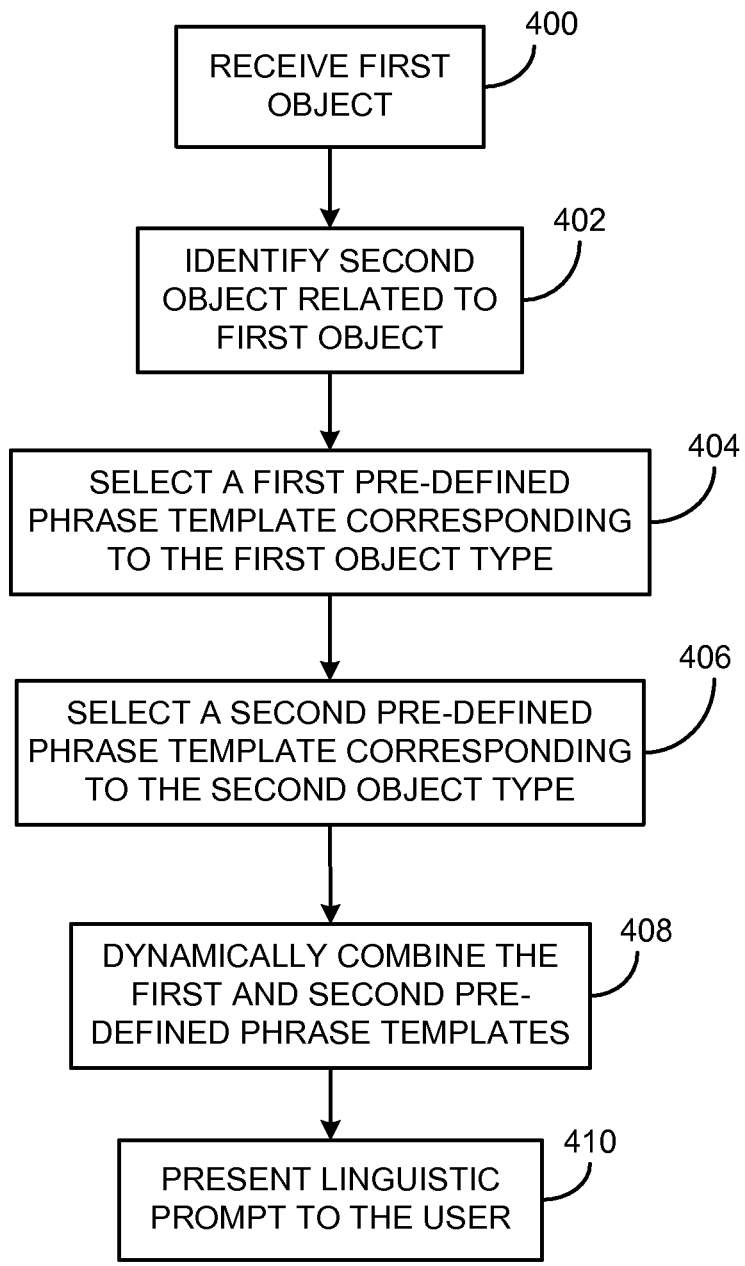
FIG. 4 is a flow diagram illustrating an exemplary process for providing a contextual description of an object according to an exemplary embodiment.

FIG. 4 is a flow diagram illustrating an exemplary process for providing a contextual description of an object according to one embodiment. Referring to FIGS. 1-3, the exemplary process begins when the object determination unit 210 receives an object to be described, i.e., a first object 240 (block 400) from an application 120 executing with respect to a user. In one embodiment, the first object 240 has an object, i.e., entity, type representing a place, event, or person that is associated with the user, and includes one or more first attributes. For example, referring to Table 3, the first object 240 can have a first object type representing a phone call (Event) and the first attribute can be at least one of the EventID, Begin Time, End Time, PlaceID, Caller PersonID, Status, and Callee PersonID associated with the first object.

When the first object is received, the object determination unit 210 identifies a second object related to the first object (block 402). Like the first object 240, the second object has a second object type representing a place, event or person that is associated with the user, and one or more second attributes. In one embodiment, the objection determination unit 210 is configured to identify the second object by selecting a query from a plurality of queries, submitting the query to the user-related database 300, and retrieving at least one object that satisfies the query via the data manager 130. When more than one object is retrieved, the object retrieved first can be designated as the second object.

In an exemplary embodiment, each of the plurality of queries is associated with the second object type, i.e., a PLACE, a PERSON, or an EVENT, and the submitted query is selected based on the first object type. Accordingly, the second object type is determined by the first object type. For example, in one embodiment, when the first object type is the PERSON type or the PLACE type, the selected query can be that associated with the EVENT type so that the second object can be an event (second object type) related to the person or place (first object type). When the first object type is the EVENT type, the selected query can be that associated with the PLACE type so that the second object can be a place related to the event. The relationship between the first object type and the query type can be specified by the user or by default. For example, when the user prefers to describe a place by referring to a person, as opposed to an event or to another place, a first object PLACE type can be correlated to a query type PERSON.

In another embodiment, two or more queries can be associated with a particular first object type. For example, when the first object type is the EVENT type, the selected queries can be those associated with the PLACE type, the PERSON type, and the EVENT type, respectively. When more than one query is selected, the queries can be submitted in an order specified by the user or in a default order. For example, the order in which the queries can be submitted can be the PLACE type first, the PERSON type second, and the EVENT type third. The first object retrieved can be designated as the second object.

Table 4 illustrates selected query types (column header) based on the first object type (row header) and the order in which multiple queries can be submitted to the database according to one embodiment.

TABLE 4

| | Query Type | | |
|---|---|---|---|
| First Object Type | Person | Event | Place |
| Person | NA | First | NA |
| Event | Second | Third | First |
| Place | NA | First | NA |

For each cell in Table 4 above, a corresponding query is provided. In an exemplary embodiment, each query includes at least one attribute of the corresponding first object 240. For example, in one embodiment, the following queries can be provided for the "first object type: query type" cells above where the EVENT type refers to the PHONE CALL subclass:

Person:Event
  SELECT second.EventID
  FROM PhoneCall second
  WHERE ((second.CallerPersonID = ?PersonID)
    OR (second. CalleePersonID = ?PersonID))
  ORDER BY second.BeginTime DESC
Place:Event
  SELECT second.EventID
  FROM PhoneCall second
  WHERE second.PlaceID = ?PlaceID
  ORDER BY second.BeginTime DESC
Event:Person
  SELECT second.PersonID
  FROM Person second
  WHERE ((second.PersonID = ?CallerPersonID)
    OR (second.PersonID = ?CalleePersonID))
Event:Place
  SELECT second.PlaceID
  FROM Place second
  WHERE second.PlaceID = ?PlaceID
Event:Event
  SELECT second.EventID
  FROM PhoneCall second
  WHERE ((second.PlaceID = ?PlaceID)
    OR (second.CallerPersonID = ?CallerPersonID)
    OR (second.CalleePersonID = ?CalleePersonID)
    OR (second.BeginTime BETWEEN ?BeginTime AND ?EndTime)
    OR (?BeginTime BETWEEN second.BeginTime AND second.EndTime))
  ORDER BY second.BeginTime DESC Referring again to FIG. 4, once the second object is identified, the object determination unit 210 passes the first and second objects to the phrase generator 220 (FIG. 2). In an exemplary embodiment, the phrase generator 220 uses the first object 240 and the second object to select a first pre-defined phrase template 222 corresponding to the first object type (block 404) and a second pre-defined phrase template 224 corresponding to the second object type (block 406).

Figure 5:
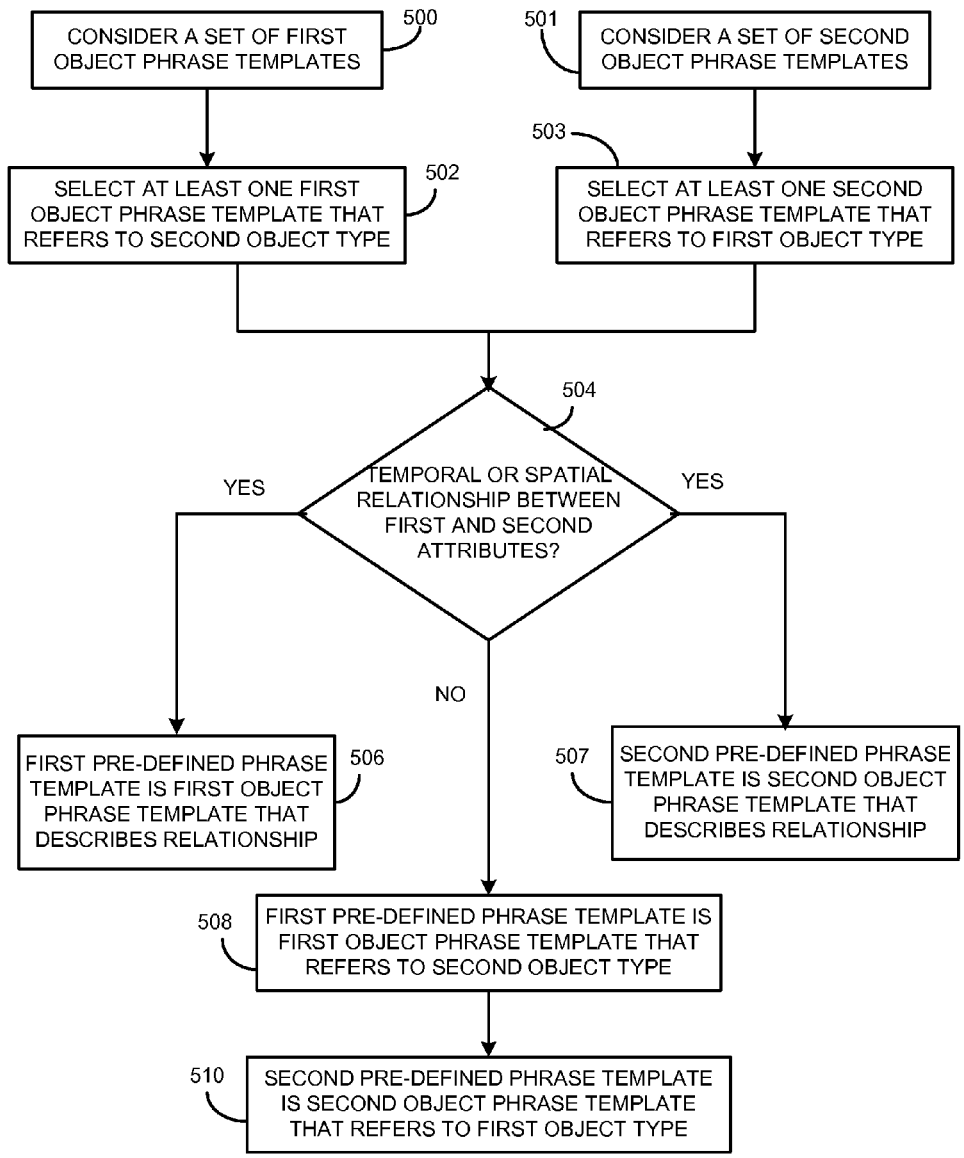
FIG. 5 is a flow diagram illustrating an exemplary process for selecting first and second pre-defined phrase templates according to one embodiment.

FIG. 5 is a flowchart illustrating a process for selecting the first and second pre-defined phrase templates according to an exemplary embodiment. The process begins by considering a set of first object phrase templates 222 (block 400) and a set of second object phrase templates 224 (block 401). In one embodiment, each phrase template 222, 224 is associated with a phrase type representing one of a place, an event or a person. A phrase template 222, 224 can be a constant string for which a type is specified, e.g., "String: Type." Here, the "type" captures the language expressions in other phrase templates where the given constant string, "String," can be placed. For example, when the second object type is Phone Call, "the call you made: Phone Call" specifies that the string "the call you made" can be used where a second object of type Phone Call is expected.

In another embodiment, a phrase template 222, 224 can include temporal relationships between two events, e.g., "String <Time-Relationship: TIME> String," and/or spatial relationships between two events, e.g., "String < Spatial-Relationship: LOC> String." A phrase template 222, 224 may also include a test condition on a particular attribute of the given object, e.g., "[TEST Attribute] String." In this case, the test condition must be satisfied for the template to be applied. In one embodiment, a phrase template 222, 224 may use slashes to separate alternative expressions thus compactly representing multiple variations. Such a template can be of the form, "String Choice-1/Choice-2 String Choice-3/Choice-4 String."

In another embodiment, a phrase template 222, 224 may include placeholder expressions that are to be replaced with specific attribute values. A placeholder expression can be of the form, "<Placeholder-Attribute: VALUE>." For example, the placeholder expression <Person.Name: VALUE> refers to the Name attribute of a PERSON object type and <Place- .Name: VALUE> refers to the Name attribute of a PLACE object type. A placeholder expression may specify a relationship between a given object and another object. For example, the placeholder expression can specify that the second object (a person) be the callee of the first object (a phone call). In another embodiment, a placeholder expression may specify a value based on a temporal or spatial relationship between the first object and the second object. For example, the placeholder expression can specify that a phone call has occurred at a certain place.

In another embodiment, a phrase template 222, 224 can have a placeholder expression that includes a temporal expression based on at least one of a time an event begins and ends. Such a temporal expression may be used to uniquely specify an object in a prompt. In one embodiment, the temporal expression can be generated as follows:

<X as offset from current time in minutes> minutes ago: if within the last 45 minutes. E, g.: "the call you made 30 minutes ago".

at <X as clock time>: if within the last 24 hours but not within the last 45 minutes. E.g.: "the call you received at 1:00 PM".

on <X as day-of-week>: if within the last 6 days but not within the last 24 hours. E.g.: "the call you made on Monday".

on <X as date>: otherwise. E.g.: "the call you received on Dec. 15, 2005".

In another embodiment, a phrase template 222, 224 can specify fields along with the object or attribute types to which they refer. Such a phrase template can be of the form, "String <Placeholder-Object: Type> String." Here, the placeholder-object is another object, i.e., it is not the object for which the phrase template is selected. In one embodiment, the placeholder-object can be a different instance of the same object type. The fields are supplied based on the specific first and second object types under consideration, and thus constrain how various phrase templates can be combined. In another embodiment, some of the fields in a phrase template 222, 224 can be used with phrase templates corresponding to specific object types. Such a phrase template can be of the form, "String <Placeholder-Attribute: Type> String." For example, <Phone Call.Callee Person ID: Person> refers to a phrase template for the Phone Call object type with any necessary values drawn from the object that matches the given object on its Callee Person ID attribute. These placeholder expressions can be determined as references from the given object to another object, and a phrase template for the other object is inserted.

Exemplary first object phrase templates are shown in Table 5 and exemplary second object phrase templates are shown in Table 6.

TABLE 5

| FIRST OBJECT TYPE | FIRST OBJECT PHRASE TEMPLATE(S) |
|---|---|
| PERSON | The person: Person |
| PHONE CALL | The call you made to <Callee Person ID: Person>; The call you received from <Caller Person ID: Person>; [TEST Caller Person ID] The call you made <before: TIME>/<after: TIME>/<during: TIME><call: Phone Call> [TEST Callee Person ID] The call you received <before: TIME>/<after: TIME>/<during: TIME><call: Phone Call> [TEST Caller Person ID] The call you made <in: LOC>/<at: LOC>/<near: LOC> <Place ID: Place> |

TABLE 5-continued

| FIRST OBJECT TYPE | FIRST OBJECT PHRASE TEMPLATE(S) |
|---|---|
| PLACE | [TEST Callee Person ID] The call you received <in: LOC>/<at: LOC>/<near: LOC> <Place ID: Place> The place: Place |

TABLE 6

| SECOND OBJECT TYPE | SECOND OBJECT PHRASE TEMPLATE(S) |
|---|---|
| PERSON | <Person.Name: VALUE> |
| PHONE CALL | <Callee Person ID: Person> whom you called; <Caller Person ID: Person> who called you [TEST Caller Person ID] the call you made: Phone Call; [TEST Callee Person ID] the call you received: Phone Call; [TEST Caller Person ID] <place: Place> where you made a call [TEST Callee Person ID] <place: Place> where you received a call |
| PLACE | <Place.Name: VALUE> |

Referring again to FIG. 5, the phrase generator 220 selects at least one first object phrase template that refers to the second object type (block 502) and at least one second object phrase template that refers to the first object type (block 503) from the set of first object phrase templates 222 and the set of second object phrase templates 224 respectively. For example, referring to Table 5 and Table 6, when the first object type is PHONE CALL, and the second object type is PERSON, the phrase generator 220 selects the two first object phrase templates that involve PERSON.

Next, the phrase generator 220 determines whether there is at least one of a temporal and spatial relationship between the first attribute of the first object 240 and the second attribute of the second object (block 504). When such a relationship exists, the phrase generator 220 identifies from the selected first object phrase templates 222 the first pre-defined phrase template that describes the relationship (block 506) and identifies from the selected second object phrase templates 224 the second pre-defined phrase template that describes the relationship (block 507). For example, referring to Table 5 and Table 6, when the first object type is PHONE CALL and the second object type is PLACE, the two first object phrase templates referring to the PLACE type are selected. Depending on the relationship between the first attribute, e.g., PlaceID of PHONE CALL, and the second attribute, e.g., PlaceID of PLACE, the phrase generator 220 identifies the first pre-defined phrase template as the first object template with "in", "at", or "near" depending on the spatial relationship between the PlaceID referenced in the PHONE CALL object and the PlaceID referenced in the PLACE object.

When a temporal and/or spatial relationship between the first attribute of the first object 240 and the second attribute of the second object does not exist (block 504), the phrase generator 220 identifies the first pre-defined phrase template as the selected first object phrase template 222 (block 508) and identifies the second pre-defined phrase template as the selected second object phrase template 224 (block 510).

Referring again to FIG. 4, once the first and second pre-defined phrase templates have been selected (blocks 404, 406), the phrase generator 220 dynamically combines the first and second pre-defined phrase templates (block 408) to form a linguistic prompt 250 related to the place, event or person representing the first object 240. In one embodiment, the phrase generator 220 concatenates the first pre-defined phrase template with the second pre-defined phrase template.

Exemplary linguistic prompts are shown in Table 7 for specified first and second object types.

TABLE 7

| FIRST OBJECT TYPE | SECOND OBJECT TYPE | LINGUISTIC PROMPT |
|---|---|---|
| PERSON | PHONE CALL | The person whom you called |
|  |  | The person who called you |
| PHONE CALL | PERSON | The call you made to <Person.Name: VALUE> |
|  |  | The call you received from <Person.name: VALUE> |
| PHONE CALL | PHONE CALL | The call you made/received before/after the call you made/received |
| PHONE CALL | PLACE | The call you made/received in/at/near <Place.Name: VALUE> |
| PLACE | PHONE CALL | The place where you made/received a call |

In one embodiment, the phrase generator 220 replaces the placeholder expression(s) in the linguistic prompt with the phrase(s) generated from the first and/or second objects as applicable. For example, when a PERSON object is involved and the linguistic prompt includes the placeholder expression <Person.Name: VALUE>, the placeholder expression can be replaced by the value in the name field of the PERSON object.

In one embodiment, the phrase generator 220 can pass the linguistic prompt 250 to a grammar checker 140 (FIG. 1A and FIG. 1B). The grammar checker 140 is configured to analyze the linguistic prompt and to detect grammatical errors. If grammatical errors are detected, the grammar checker 140 can correct the errors automatically. Once the linguistic prompt 250 is formed and optionally modified to conform to grammatical rules, the presentation unit 230 presents the linguistic prompt 250 to the user to describe the place, event or person representing the first object 240 (block 410).

According to the embodiments described above, the first object 240 is described in relation to a second object. In another embodiment, the first object 240 can be described in relation to the second object and to a third object in order to provide a more complex description. For example, a linguistic prompt based on second and third objects can be, "The call you received during the call you made to Bob" instead of the simpler description, "The call you received during the call you made."

In one embodiment, a third object can be identified that has a third attribute related to the second and first attributes. Like the first and second objects, the third object has a third object type representing one of a place, an event, and a person. A third pre-defined phrase template corresponding to the third object type can be selected based on at least one of the first and second object types and on the first and second attributes. The linguistic prompt can then be formed by dynamically combining the third pre-defined phrase template with the first and second pre-defined phrase templates.

In another embodiment, additional second object phrase templates 224 can be provided that refer to the first object and to the third object. For example, an additional second object phrase template for a PHONE CALL object type can refer to a PERSON object type in the same way that the first object phrase template for a PHONE CALL object type refers to a PERSON object type. That is, the additional second object phrase template for a PHONE CALL object type can be "[TEST Caller Person ID] the call you made to <Callee Person ID: Person>: Phone Call."

The executable instructions of a computer program as illustrated in FIG. 4, and FIG. 5 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example, but is not limited to, an electronic, magnetic, optical, electromagnetic, infrared, or semiconductor system, apparatus, device, or propagation medium.

More specific examples (a non-exhaustive list) of the computer readable medium can include the following: a wired network connection and associated transmission medium, such as an ETHERNET transmission system, a wireless network connection and associated transmission medium, such as an IEEE 802.11(a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for providing a contextual description of an object, the method comprising:

receiving a first object having a first object type representing a person, the first object associated with a first user and including a first attribute associated with the respective person;

identifying a second object having a second attribute related to the first attribute, the second object having a second object type representing an event;

retrieving, from a data store, a first pre-defined phrase template corresponding to the first object type and a second pre-defined phrase template corresponding to the second object type;

determining automatically a temporal phrase template including a temporal expression based on a time related to the event, the temporal phrase template selected from a plurality of phrase templates based on an interval of the time related to the event such that different phrase templates are associated with different intervals;

dynamically combining the first pre-defined phrase template with the second pre-defined phrase template and with the temporal phrase template to form a linguistic prompt related to the person representing the first object, wherein the linguistic prompt comprises the first pre-defined phrase template, the second pre-defined phrase template, and the temporal phrase template; and presenting the linguistic prompt,
wherein at least one of the preceding actions is performed on at least one electronic hardware component.

2. The method of claim 1 wherein identifying the second object includes:
providing a query including the first attribute and having a query type representing one of a place, an event and a person, wherein the query type is based on the first object type; and
executing the query to retrieve the respective place, event, or person having an attribute that satisfies the query.

3. The method of claim 1 wherein identifying the second object includes:
providing a plurality of queries, wherein each query includes the first attribute and has a query type representing one of a place, an event, and a person;
sorting the plurality of queries in an order based on the first object type;
executing the plurality of queries in order to determine whether the corresponding place, event, or person has an attribute that satisfies the query; and
retrieving the corresponding place, event, or person having an attribute that satisfies the query.

4. The method of claim 3 wherein the second object is retrieved first.

5. The method of claim 1 wherein prior to combining the first pre-defined phrase template with the second pre-defined phrase template, the method comprises:
considering a set of first object phrase templates associated with the first object type;
considering a set of second object phrase templates associated with the second object type;
selecting from the set of first object phrase templates at least one first object phrase template that refers to the second object type; and
selecting from the set of second phrase templates at least one second object phrase template that refers to the first object type.

6. The method of claim 5 further comprising:
identifying from the selected first object phrase templates the first pre-defined phrase template based on at least one of a temporal and a spatial relationship between the first attribute of the first object and the second attribute of the second object; and
selecting from the selected second object phrase templates the second pre-defined phrase template based on at least one of a temporal and a spatial relationship between the first and second attributes.

7. The method of claim 1 further comprising:
identifying a third object having a third attribute related to the second and first attributes, the third object having a third object type representing one of a place, an event and a person;
selecting a third pre-defined phrase template corresponding to the third object type based on at least one of the first and second object types and on the first and second attributes; and
dynamically combining the third pre-defined phrase template corresponding to the third object type with the first and second pre-defined phrase templates to form the linguistic prompt related to the place, event, or person representing the first object.

8. The method of claim 1 further comprising providing a placeholder expression in at least one of the first and second pre-defined phrase templates and wherein combining the first and second pre-defined phrase templates includes replacing the placeholder expression with a value designated by the placeholder expression.

9. The method of claim 8 wherein the placeholder expression includes a temporal expression based on at least one of a time an event begins and ends.

10. The method of claim 1 wherein prior to presenting the linguistic prompt to the one of the first and second users, the method comprises:
analyzing the linguistic prompt to detect grammatical errors in the linguistic prompt; and
correcting any detected grammatical errors.

11. A non-transitory computer readable medium containing program instructions, which when executed, perform a method for providing a contextual description of an object, the computer readable medium comprising program instructions for:
receiving a first object having a first object type representing a person, the first object associated with a first user and including a first attribute associated with the respective person;
identifying a second object having a second attribute related to the first attribute, the second object having a second object type representing an event;
retrieving, from a data store, a first pre-defined phrase template corresponding to the first object type and a second pre-defined phrase template corresponding to the second object type;
determining automatically a temporal phrase template including a temporal expression based on a time related to the event, the temporal phrase template selected from a plurality of phrase templates based on an interval of the time related to the event such that different phrase templates are associated with different intervals;
dynamically combining the first pre-defined phrase template with the second pre-defined phrase template and with the temporal phrase template to form a linguistic prompt related to the person representing the first object, wherein the linguistic prompt comprises the first pre-defined phrase template, the second pre-defined phrase template, and the temporal phrase template; and
presenting the linguistic prompt.

12. The computer readable medium of claim 11 wherein instructions for identifying the second object include:
providing a query including the first attribute and having a query type representing one of a place, an event and a person, wherein the query type is based on the first object type; and
executing the query to retrieve the respective place, event, or person having an attribute that satisfies the query.

13. The computer readable medium of claim 11 wherein instructions for identifying the second object include:
providing a plurality of queries, wherein each query includes the first attribute and has a query type representing one of a place, an event, and a person;
sorting the plurality of queries in an order based on the first object type;
executing the plurality of queries in order to determine whether the corresponding place, event, or person has an attribute that satisfies the query; and
retrieving the corresponding place, event, or person having an attribute that satisfies the query.

14. The computer readable medium of claim 13 wherein the second object is retrieved first.

15. The computer readable medium of claim 11 wherein prior to combining the first pre-defined phrase template with the second pre-defined phrase template, the computer readable medium comprises instructions for:
  providing a set of first object phrase templates associated with the first object type;
  providing a set of second object phrase templates associated with the second object type;
  selecting from the set of first object phrase templates at least one first object phrase template that refers to the second object type; and
  selecting from the set of second phrase templates at least one second object phrase template that refers to the first object type.

16. The computer readable medium of claim 15 further comprising instructions for:
  identifying from the selected first object phrase templates the first pre-defined phrase template based on at least one of a temporal and a spatial relationship between the first attribute of the first object and the second attribute of the second object; and
  selecting from the selected second object phrase templates the second pre-defined phrase template based on at least one of a temporal and a spatial relationship between the first and second attributes.

17. The computer readable medium of claim 11 further comprising instructions for:
  identifying a third object having a third attribute related to the second and first attributes, the third object having a third object type representing one of a place, an event and a person;
  selecting a third pre-defined phrase template corresponding to the third object type based on at least one of the first and second object types and on the first and second attributes; and
  dynamically combining the third pre-defined phrase template corresponding to the third object type with the first and second pre-defined phrase templates to form the linguistic prompt related to the place, event, or person representing the first object.

18. The computer readable medium of claim 11 further comprising instructions for providing a placeholder expression in at least one of the first and second pre-defined phrase templates and wherein instructions for combining the first and second pre-defined phrase templates include replacing the placeholder expression with a value designated by the placeholder expression.

19. The computer readable medium of claim 18 wherein the placeholder expression includes a temporal expression based on at least one of a time an event begins and ends.

20. The computer readable medium of claim 11 wherein prior to presenting the linguistic prompt to the one of the first and second users, the computer readable medium comprises instructions for:
  analyzing the linguistic prompt to detect grammatical errors in the linguistic prompt; and
  correcting any detected grammatical errors.

21. An apparatus for providing a contextual description of an object, the apparatus comprising system components including:
  a data store configured to store information relating to places, events and people associated with one or more users,
  an object description module coupled to the data store, the object description module comprising:
  an object determination unit configured to receive a first object having a first object type representing a person, the first object associated with a first user and including a first attribute associated with the respective person, and to identify a second object having a second attribute related to the first attribute, the second object having a second object type representing an event;
  a phrase generator configured to retrieve, from the data store, a first pre-defined phrase template corresponding to the first object type and a second pre-defined phrase template corresponding to the second object type, determining automatically a temporal phrase template including a temporal expression based on a time related to the event, the temporal phrase template selected from a plurality of phrase templates based on an interval of the time related to the event such that different phrase templates are associated with different intervals, and dynamically combine the first pre-defined phrase template with the second pre-defined phrase template and with the temporal phrase template to form a linguistic prompt related to the person representing the first object, wherein the linguistic prompt comprises the first pre-defined phrase template, the second pre-defined phrase template, and the temporal phrase template; and
  a presentation unit configured to present the linguistic prompt;
  wherein at least one of the system components includes at least one electronic hardware component.

22. The apparatus of claim 21 wherein the object determination unit is configured to identify the second object by executing a query including the first attribute and having a query type representing one of a place, an event and a person, wherein the query type is based on the first object type, and retrieving the respective place, event, or person having an attribute that satisfies the query.

23. The apparatus of claim 21 wherein the object determination unit is configured to identify the second object by:
  considering a plurality of queries, wherein each query includes the first attribute and has a query type representing to one of a place, an event, and a person;
  sorting the plurality of queries in an order based on the first object type;
  executing the plurality of queries in order to determine whether the corresponding place, event, or person has an attribute that satisfies the query; and
  retrieving from the data store the corresponding place, event, or person having an attribute that satisfies the query.

24. The apparatus of claim 23 wherein the second object is retrieved first.

25. The apparatus of 21 wherein prior to combining the first pre-defined phrase template with the second pre-defined phrase template, the phrase generator is configured to consider a set of first object phrase templates associated with the first object type, to consider a set of second object phrase templates associated with the second object type, to select from the set of first object phrase templates at least one first object phrase template that refers to the second object type, and to select from the set of second phrase templates at least one second object phrase template that refers to the first object type.

26. The apparatus of claim 25 wherein the phrase generator is further configured to identify from the selected first object phrase templates the first pre-defined phrase template based on at least one of a temporal and a spatial relationship between the first attribute of the first object and the second attribute of the second object, and to select from the selected second object phrase templates the second pre-defined phrase template based on at least one of a temporal and a spatial relationship between the first and second attributes.

27. The apparatus of claim 21 wherein the object determination unit is configured to identify a third object having a third attribute related to the second and first attributes, the third object having a third object type representing one of a place, an event and a person, and wherein the phrase generator is configured to select a third pre-defined phrase template corresponding to the third object type based on at least one of the first and second object types and on the first and second attributes, and to dynamically combine the third pre-defined phrase template corresponding to the third object type with the first and second pre-defined phrase templates to form the linguistic prompt related to the place, event, or person representing the first object.

28. The apparatus of claim 21 wherein the phrase generator is configured to replace a placeholder expression in at least one of the first and second pre-defined phrase templates with a value designated by the placeholder expression.

29. The apparatus of claim 28 wherein the placeholder expression includes a temporal expression based on at least one of a time an event begins and ends.

30. The apparatus of claim 21 further comprising a grammar checking unit configured to analyze the linguistic prompt to detect grammatical errors in the linguistic prompt, and to correct any detected grammatical errors.

31. The apparatus of claim 21 wherein the apparatus is an electronic device associated with the one of the first and second users that includes:
 a plurality of utility applications, wherein the first object is received from one of the utility applications; and
 an interface for displaying the linguistic prompt to the one of the first and second users.

32. The apparatus of claim 21 wherein the apparatus is a server comprising:
 a communication interface for communicating with a mobile communication device associated with the one of the first and second users over a network and configured to receive the first object from one of a plurality of utility applications included in the mobile communication device and to transmit the linguistic prompt to the one of the first and second users via the mobile communication device.

33. A system for providing a contextual description of an object, the apparatus comprising:
 means for receiving a first object having a first object type representing a person, the first object associated with a first user and including a first attribute associated with the respective person;
 means for identifying a second object having a second attribute related to the first attribute, the second object having a second object type representing an event;
 means for retrieving, from a data store, a first pre-defined phrase template corresponding to the first object type and a second pre-defined phrase template corresponding to the second object type;
 means for determining automatically a temporal phrase template including a temporal expression based on a time related to the event, the temporal phrase template selected from a plurality of phrase templates based on an interval of the time related to the event such that different phrase templates are associated with different intervals;
 means for dynamically combining the first pre-defined phrase template with the second pre-defined phrase template and with the temporal phrase template to form a linguistic prompt related to the person representing the first object, wherein the linguistic prompt comprises the first pre-defined phrase template, the second pre-defined phrase template, and the temporal phrase template; and
 means for presenting the linguistic prompt,
 wherein at least one of the means includes at least one electronic hardware component.

* * * * *